. E. STUCKERT 3,507,378
KEYBOARD FOR DISPLAYING ONE OF A PLURALITY OF SYMBOLIC SETS STORED THEREIN
Filed June 10, 1968 3 Sheets-Sheet 1

INVENTOR
PAUL E. STUCKERT

April 21, 1970 P. E. STUCKERT 3,507,378

KEYBOARD FOR DISPLAYING ONE OF A PLURALITY OF SYMBOLIC SETS STORED THEREIN

Filed June 10, 1968 3 Sheets-Sheet 2

April 21, 1970 P. E. STUCKERT 3,507,378

KEYBOARD FOR DISPLAYING ONE OF A PLURALITY OF SYMBOLIC SETS STORED THEREIN

Filed June 10, 1968 3 Sheets-Sheet 3

United States Patent Office 3,507,378
Patented Apr. 21, 1970

3,507,378

KEYBOARD FOR DISPLAYING ONE OF A PLURALITY OF SYMBOLIC SETS STORED THEREIN

Paul E. Stuckert, Katonah, N.Y., assignor to International Business Machines Corporation, Armonk, N.Y., a corporation of New York Filed June 10, 1968, Ser. No. 735,894
Int. Cl. B41j 5/08
U.S. Cl. 197—98 1 Claim

ABSTRACT OF THE DISCLOSURE

A keyboard comprising a storage means for storing a plurality of symbolic sets, an edge illuminating means for selectively edge illuminating one of the symbolic sets and a display means for making visible to the viewer the illuminated symbolic set of the face of the keys of the keyboard.

BACKGROUND OF THE INVENTION

The field of the invention involves subject matter relating to alterable keyboards having indicators within the keys of said keyboard to display the symbols of a selected symbolic set stored within the keyboard. More specifically, the field of invention relates to subject matter directed to visual indicators having liquid or solid optical means for distributing light within said means.

PRIOR ART

A problem existing with respect to computer terminals and conventional typewriters is the limitation that keyboards cannot be conveniently relabeled. With the advent of interchangeable type heads in the typewriter, this becomes an unfortunate restriction which limits the inherent flexibility of the interchangeable type heads in the typewriter.

In the past, many attempts have been made to find an acceptable solution to this problem. One such attempt consisted of the use of resilient plastic overlays for changing the symbolic designation associated with each key on a given keyboard. However, it was found that the resilient plastic overlays wear out quickly and affects the typist's "feel" of the keyboard itself. Another solution to this problem incorporates the use of optical fiber light pipes. This solution was found to be unsatisfactory from a cost viewpoint. Another solution was to provide a keyboard map by which the typist can associate visually the new symbol to be associated with a given key on a keyboard. This was found to be not acceptable except for occasional use by experienced typists, who do not need to look back and forth between the keyboard map and the keyboard itself.

Therefore, an objective of the present invention is to provide an alterable keyboard for selecting and displaying a plurality of symbolic sets on the keys of the keyboard.

A further objective of the invention is to provide symbolic sets that are interchangeable within a given keyboard.

A further object of the invention is to provide an alterable keyboard that does not affect the "feel" of the keyboard and allows the operator an easy and quick method of selecting one of a plurality of symbolic sets stored within the keyboard.

SUMMARY OF THE INVENTION

The invention addresses itself to the problem of providing a relatively easy means to alter the symbolic set of symbols associated with the keys on a given keyboard.

Accordingly, under each key, there is located a stack of plastic layers having symbols thereon. Depending upon which layer in the stack is illuminated, a particular symbol will appear as a visible indication in the face of each of the actual keys of the keyboard. By simply moving the light source so as to selectively illuminate different layers under the keys of said keyboard, it can be readily realized that different symbolic sets can be selected and displayed.

In a first embodiment of the invention, a storage means comprising a plurality of flexible plastic layers runs under all keys wherein suitable characters are provided in the regions of the layers which are located directly under the keys on the keyboard. The keys are built in two parts, a first part comprising the key cap with the character layers located directly thereunder and a second part comprising an actual activation rod which energizes the particular designated symbol represented by that key position on the keyboard.

In another embodiment, a storage means comprising a plurality of keys where each key contains a plurality of layers embedded within the key and adapted for selective edge illumination wherein different layers contain different characters. Edge illumination means is provided for the complete keyboard and depending upon the location of a light selection slit, a particular symbolic set of symbols will be illuminated such that the symbols will appear on the face of the various keys.

BRIEF DESCRIPTION OF THE DRAWING

The foregoing and other objectives, features and advantages of the invention will be apparent from the foregoing and more particular description of the preferred embodiments of the invention, as illustrated in the accompanying drawing.

In the drawing.

Embodiment 1

Figure 1:
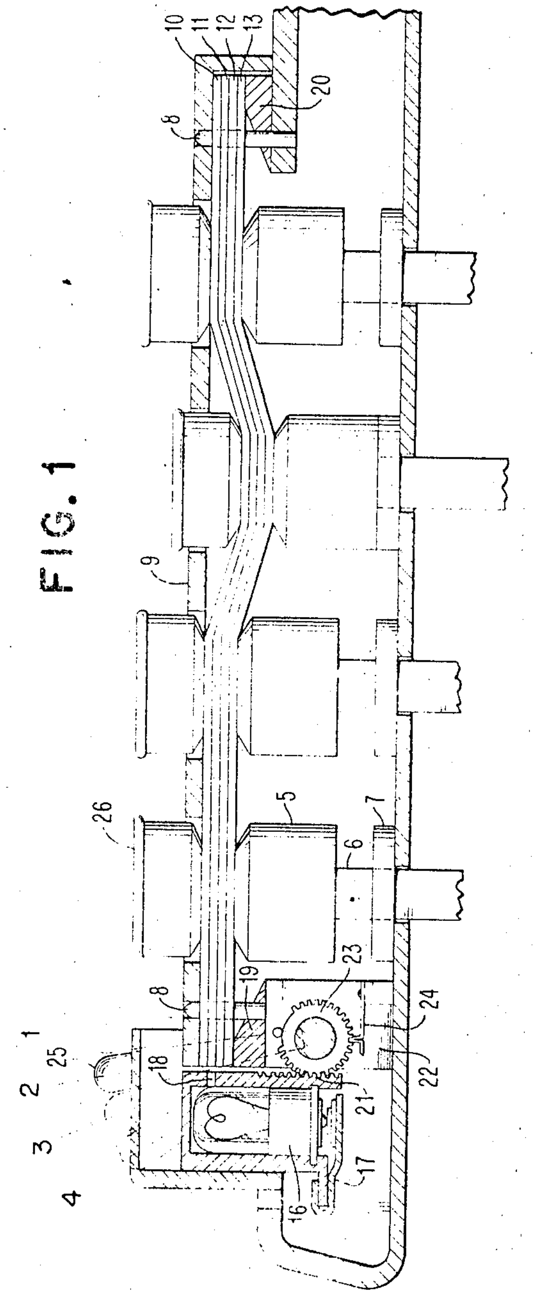
FIGURE 1 is a sectional view of the alterable keyboard in the first embodiment of the invention.

FIGURE 1 is a sectional view of the alterable keyboard which shows the essential parts comprising the alterable keyboard. The keyboard consists of a plurality of keys. Each key is comprised of a key cap 26, a rod actuator 5 and a key rod 6. A bumper 7 is used to control the amount of depression for a given key on the keyboard.

The selection means of the first embodiment is comprised of lamp housing 17 and lamp positioner 22. A source of light is made available from light housing 17 which houses a linear lamp or a series of lamps 16. The light housing 17 also contains a light slit 18 for directing the light from the lamps 16 to the selected layers 10, 11, 12, or 13. Lamp housing 17 is connected to lamp positioner 22 for controlling the critical position of the lamp housing 17. Lamp positioner 22 consists of a pinion 23, a rack 21 on lamp housing 17, a detent 24 and a control arm 25. It should be noted that lamp positioner 22 may take the form of any mechanical mechanism suitable for moving the lamp housing 17 with the accuracy needed for proper alignment of light slit 18 with layers 10, 11, 12 and 13.

An alignment means comprised of a series of alignment pins 8 held by structural members 19 and 20 is provided within the keyboard.

A storage means comprising a plurality of layers 10, 11, 12 and 13 having symbolic sets thereon is shown on the alignment pins 8 and passing between the key caps 26 and the rod actuators 5 of the keys on the keyboard. A frame 9 is used to retain and position the key caps 26 and the top most layer 10 inserted into the keyboard.

Figure 2:
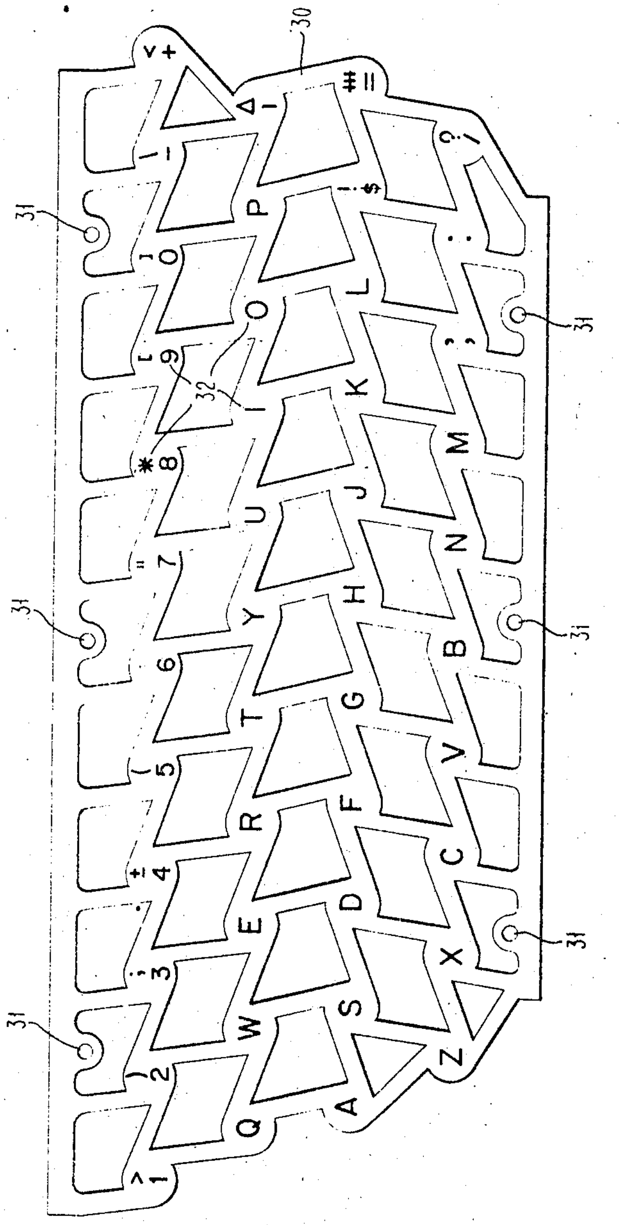
FIGURE 2 is a typical symbolic set used in the alterable keyboard in the first embodiment of the invention.

FIGURE 2 shows a typical layer 30 within the storage means. The layer 30 is made of transparent plastic, such as acrylic, where the desired characters are embossed or engraved in each of the information regions 32. An information region 32 is that area of layer 30 which will be directly underneath a key cap 26 when layer 30 and alignment holes 31 are placed on alignment pins 8 within the keyboard. In order to provide deformability while providing light transmission, layer 30 is arranged in a spider fashion having webs connecting the information regions 32. The layer 30 also has the characteristic that if the edge of the layer 30 is illuminated that each of the embossed or engraved characters thereon will also be illuminated. The regions of the layer 30 not designated as information regions 32 are covered with a relatively thin opaque material to minimize light leakage and to provide a small air gap between the information regions 32 on the stacked layers 10, 11, 12 and 13 stored within the keyboard.

Figure 3A:
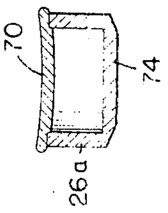
FIG. 3A shows a first type of key cap.
Figure 3B:
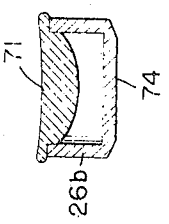
FIG. 3B shows a second type of key cap having a magnifying portion.
Figure 3C:
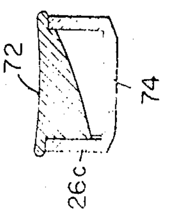
FIG. 3C shows a third type of key cap having a prism portion.
Figure 3D:
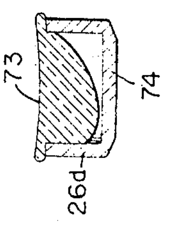
FIG. 3D shows a fourth type of key cap having both magnifying and prism portions.

FIGURE 3A shows a key cap 26*a* wherein both the bottom 74 and the top 70 are made of transparent plastic. The bottoms 74 are invariant, but the tops 70 may be so constructed to provide optical modification of the symbolic set in the information regions 32 of the layers 10, 11, 12 and 13. FIGURE 3B shows a key cap 26*b* having a magnifying top portion 71. FIGURE 3C shows a key cap 26*c* having a top portion 72 containing a prism. FIGURE 3D shows a key cap 26*d* having a top portion 73 containing a combination of a prism and a magnification lens. It should be noted, that in a given keyboard, different prisms with different orientations can be used to make all characters especially visibile to the operator. All parts of the key caps 26 which are not in the optical path may have surface treatment, (such as painting, roughening, or an opaque overlay) to reduce reflections or interference due to incident ambient light.

Again referring to FIGURE 1, the operator in order to insert into the keyboard the layers 10, 11, 12 and 13 having the symbolic sets which he desires to store as the storage means within the keyboard, removes the unit comprising key caps 26, top layer 10 and the metal frame 9 from the keyboard. Key caps 26 are permanently affixed to top layer 10 to secure key caps 26 to information regions 32. The selective layers 11, 12, and 13 are then placed over alignment pins 8. Thus if top layer 10 is replaced, all key caps 26 and metal frame 9 will also be replaced. Any one of the layers 10, 11, 12 or 13 may be selected by moving the lamp housing 17 by means of the lamp positioner 22 such that the light slit 18 provides illumination to the edge of the layers 10, 11, 12 or 13 having the desired symbolic set which is to be displayed on key caps 26.

When a given key position is depressed, layers 10, 11, 12 and 13 deform, transmitting the pressure to rod actuator 5, moving key rod 6 a distance dictated by the distance between bumper 7 and the normal position of rod actuator 5. The key rod 6 performs a desired function of transmitting the intelligence that a given key position has been depressed on the keyboard within a given apparatus.

If it is desired to change the symbolic set to be associated with the keys on the keyboard, the operator has only to move the selection means by using control arm 25 to position 1, 2, 3, or 4 of lamp housing 17 such that the light slit 18 illuminates another layer 10, 11, 12 or 13 of the storage means containing the new desired symbolic set. The symbols will be illuminated and will appear in the key caps 26.

It should be noted that the inventor has used for example four layers of storage within the keyboard. It is not the inventor's intention to indicate that only four layers may be used but rather that an indefinite number of layers may be used. The number of layers that may be used is dictated by the amount of vertical movement of lamp housing 17 and the relative thickness of the layers containing the symbolic sets.

Embodiment 2

Figure 4:
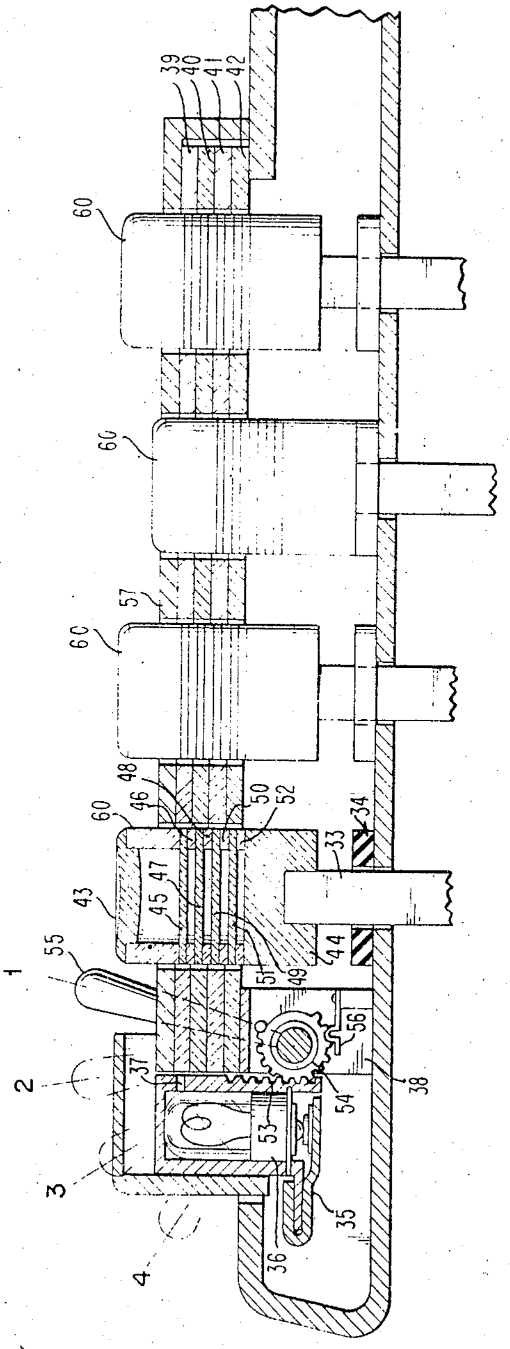
FIGURE 4 is a sectional view of the alterable keyboard in the second embodiment of the invention.

FIGURE 4 is a sectional view of the second embodiment of the invention. The keyboard consists of a plurality of key 60. A bumper 34 is used to control the amount of depression for a given key 60 on the keyboard.

A selection means similar to that in Embodiment 1 is provided. A source of light is made available from light housing 35 which houses a linear lamp or a series of lamps 36. Lamp housing 35 is connected to lamp positioner 38 for controlling the vertical position of a light housing 35. The light housing 35 also contains a light slit 37 for directing the light from the lamps 36 to the selected light distribution layers 39, 40, 41 or 42. Lamp positioner 38 consists of a pinion 54, a rack 53 on lamp housing 35, a detent 56 and a control arm 55. It should be noted that lamp positioner 38 may take the form of any mechanical mechanism suitable for moving the lamp housing 35 with the accuracy needed for proper alignment of light slit 37 with layers 39, 40, 41 and 42. The selection means also contains a plurality of light distribution layers 39, 40, 41 and 42 made of a plastic material, such as acrylic, which are separated by thin opaque light barriers (not shown in the drawing). A metal frame 57, through which the keys 60 pass, is used to retain and position the light distribution layers 39, 40, 41 and 42.

The storage means is comprised of the plurality of keys 60 where each key 60 is comprised of an opaque cylindrical structure 44 for receiving the key rod 33, a plurality of character discs 45, 47, 49 and 51 made of a plastic material, such as acrylic, on which are embossed or engraved the desired characters of the symbolic sets to be stored within the keyboard, a plurality of opaque washers 46, 48, 50 and 52 for separating character discs 45, 47, 49 and 51 and an opaque cylindrical structure 44 in which a transparent window 43 is mounted. It should be realized that although the keys 60 are shown as solid structures, it would be within the state of the art to provide means for replacement of any or all of the character discs 45, 47, 49 and 51 in any given key or in the entire set of keys on a given keyboard. It should also be here noted, that each key 60 may incorporate the magnification and/or prism structures that are shown in FIGURES 3A through 3D of key caps 26 of the first embodiment.

In operation the operator selects the symbolic set which he desires to be displayed on the keys 60 of the keyboard by moving lamp housing 35 by means of control arm 55 to positions 1, 2, 3, or 4 of light positioner 38 such that light slit 37 is aligned with the light distribution layer 39, 40, 41, or 42 which will transmit the light to the proper character discs 45, 47, 49 and 51 within the keys 60 when the key 60 is in a nondepressed state. Here again, the second embodiment allows the operator the capability to select any one of a given plurality of symbolic sets stored within the keyboard. Further, if the keys 60 are so made such that the character discs 45, 47, 49 and 51 can be replaced within the keys 60, then the operator has the option of storing any combination of symbolic sets which he wishes to be stored in the keyboard at any given time. When any key 60 is depressed, associated rod actuator 33 transmits the intelligence that a given key position has been depressed on the keyboard to the apparatus containing the keyboard.

It should be noted that color can be incorporated in the alterable keyboard in numerous ways in both Embodiments 1 or 2. In the first embodiment, color may be incorporated by making the layers 10, 11, 12 and 13 having embossed or engraved symbolic sets thereon of colored plastic, or by coloring only the information regions 32 of the layer bearing the embossed or engraved symbolic sets thereon, or by making either the top or bottom of selected key caps 26 of a colored plastic or by the coloring of the illuminated edge of the layers 10, 11, 12 and 13 having the embossed or engraved symbolic sets thereon. Color may be incorporated in the second embodiment of the invention by making the character disks 45, 47, 49 and 51 of colored plastic, or by making the light distribution layers 39, 40, 41 and 42 of different colored plastic, or by coloring the illuminated edges of the character disks 45, 47, 49 and 51 within the keys or by coloring the illuminated edge of the light distribution layers 39, 40, 41, and 42 within the keyboard.

The advantages of Embodiment 1 and Embodiment 2 are that they allow a plurality of symbolic sets to be stored within a given keyboard on a given apparatus containing that keyboard allowing efficient selection of the desired symbolic sets stored within the keyboard wherein the "feel" of the keyboard does not change as different symbolic sets stored within the keyboard are selected.

What is claimed is:

1. A keyboard structure having the constant $n>1$ and the constant $k>1$ comprising:
   - $n$ keys, each of said $n$ keys comprising,
     - a key cap having a transparent top and bottom portion, and
     - a rod actuator;
   - $k$ layers, each of said $k$ layers being made of deformable transparent plastic and having $n$ information regions therein, said $n$ information regions having a symbolic set thereon;

- an alterable storage means formed from stacking said $k$ layers, said storage means passing between said key cap and rod actuator of said $n$ keys, each of said key caps of said $n$ keys being physically attached to one of said information regions of the top layer of said $k$ stacked layers in said storage means; and
   - edge illuminating means for selectively edge illuminating the one of said $k$ layers in said storage means having the desired symbolic set to be displayed in said key cap of said $n$ keys.

References Cited

UNITED STATES PATENTS

| | | | |
|---|---|---|---|
| 1,557,076 | 10/1925 | Miller | 197—104 |
| 1,653,683 | 12/1927 | Whitaker | 197—98 X |
| 2,262,930 | 11/1941 | Gasper. | |
| 2,476,257 | 7/1949 | Hoff | 240—1 X |
| 2,722,762 | 11/1955 | Krajian | 40—130 |
| 2,751,584 | 6/1956 | Isborn | 40—130 X |
| 2,766,447 | 10/1956 | Woodson et al. | 240—1 X |
| 2,994,971 | 8/1961 | Meisenheimer et al. | 40—130 X |
| 3,107,771 | 10/1963 | Debus | 197—107 |
| 3,387,693 | 6/1968 | Wirth | 197—98 |

FOREIGN PATENTS

| | | |
|---|---|---|
| 350,376 | 6/1931 | Great Britain. |

OTHER REFERENCES

IBM Technical Disclosure Bulletin, "Changeable Keyboard Labeling and Coding," E.V. Weber, vol. 6, No. 1, June 1963, p. 39.

ERNEST T. WRIGHT, Jr., Primary Examiner

U.S. Cl. X.R.

197—102, 107